(No Model.)

J. LINDSAY.
ELASTIC SECTIONAL TIRE FOR VEHICLE WHEELS.

No. 573,471. Patented Dec. 22, 1896.

WITNESSES

INVENTOR
Joseph Lindsay
BY
Thomas Drew Stetson
ATTORNEY

UNITED STATES PATENT OFFICE.

JOSEPH LINDSAY, OF DUBLIN, IRELAND.

ELASTIC SECTIONAL TIRE FOR VEHICLE-WHEELS.

SPECIFICATION forming part of Letters Patent No. 573,471, dated December 22, 1896.

Application filed August 15, 1896. Serial No. 602,883. (No model.) Patented in England September 27, 1895, No. 18,051.

*To all whom it may concern:*

Be it known that I, JOSEPH LINDSAY, a subject of the Queen of Great Britain and Ireland, residing at No. 2 Innisfallen Parade, Dublin, Ireland, have invented certain Improvements Relating to Elastic Sectional Tires for Wheels of Carriages and other Vehicles, (for which I have obtained a patent in Great Britain, dated September 27, 1895, No. 18,051;) and I do hereby declare that the following is a full, clear, and exact description of the invention, which will enable others skilled in the art to which it appertains to make and use the same.

This invention is especially designed to reduce the evils of puncture, while at the same time preserving the necessary elasticity and resiliency whereby the vibration may be reduced to a minimum.

In order that my said invention may be more readily understood and carried into practice, I will proceed to describe the same with the aid of the accompanying drawings.

Figure 1:
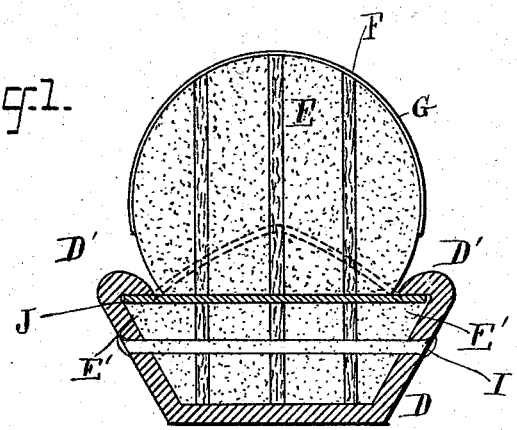
Figure 2:
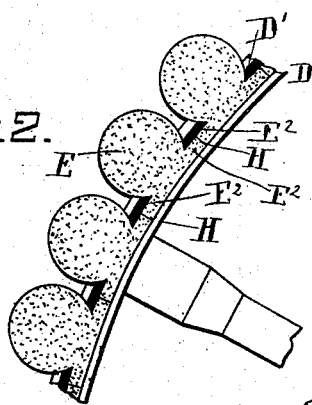
Figure 3:
Figure 4:
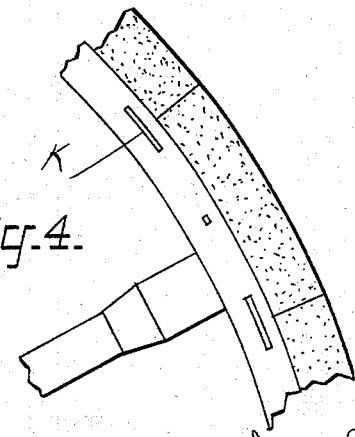

Figure 1 is a cross-section of the tire and the rim combined, whether the tire be composed of balls or of other form of sections, as hereinafter more fully described. Fig. 2 is a circumferential section on a smaller scale, showing a tire composed of elastic balls prepared and fitted according to my invention. Fig. 3 is a detail view, and Fig. 4 is an elevation illustrating another construction of a sectional tire according to my invention.

Similar letters of reference indicate corresponding parts in all the figures where they appear.

My rim D may be like the ordinary metal rim, Fig. 1, as used for pneumatic or cushion tires, with the modification that I form internal lips D' on the edges of the flanges. This rim may be secured to the spokes in any suitable way, preferably in the manner shown, and which is fully described in an application for United States patent for improvements in the construction of wheels for carriages and other vehicles filed by me on the same date as this application.

E E are the elastic balls, formed each with square shoulders E' E², extending completely around at the base. The edges of the shoulders E' which lie parallel with the plane of the wheel have the shape of the cross-section of the channel of the rim to which the balls are applied. These balls are inserted in the rim by forcing down until the two proper shoulders E' engage under the lips D', whereupon the projecting ball will be securely held in position.

In order to further insure the security of the balls, flat steel plates J, Figs. 1, 2, and 3, are inserted between each and the next by forcing the same down in the center until the ends are caught by the lips D' of the rim D. The dotted lines in Fig. 1 show a bent form in which these plates may be inserted, allowing the ends to be forced down past the lips D' and subsequently extended by straightening, so as to reliably engage therewith and to hold down firmly on the transverse pair of shoulders E² of the two adjacent balls. (See Fig. 2.)

The balls cannot under the ordinary conditions of use be wrenched from their seat, while should it be necessary to replace one or more the requisite plates J may readily be rebent by a suitable instrument and lifted again, and the injured ball or balls may then be worked out by hand and new ones inserted and again secured. The ends of the sections may be cemented together by filling the joints with cement H, and all the sections composing the tire are preferably enveloped in a suitable cover of canvas or other suitable material G, whereby the continuity of the tire is insured and even joints maintained.

For the purpose of strengthening the texture and diminishing the torsional tendency of the material composing the ball or section herein described two or more strips of canvas or other suitable substance F are placed vertically in the material during the process of manufacture. These strips help to bind firmly the outer and inner portions of the tire and to neutralize any tendency to tearing or torsion. In order to further secure the sections in the rim, transverse pins or rivets I are inserted at intervals through the rim and the bases of the elastic material.

A tire constructed according to my invention affords a great amount of resiliency, while should a section be injured it can, with a little care to separate the cemented joints, be removed and replaced without disturbing the tire-body. It is moreover evident that when the pneumatic construction is adopted the evils due to puncture are largely obviated.

Modifications may be made without departing from the principle or sacrificing the advantages of the invention.

A modification is illustrated in Fig. 4, where I form the same more uniformly continuous by producing nearly corresponding short lengths of elastic material the uniform cross-section of which corresponds exactly to the section of the ball just described. In this modification each of the sections (which, like the other form, may be hollow or solid) is pressed into the rim, as in the case of the balls above described. In this form K may represent transverse locking-pieces of considerable width which engage in recesses in the abutting faces of the sections, giving an effect closely akin to the locking of the transverse plate J on the transverse shoulders $E^2$ in the other form.

I claim as my invention—

1. A tire comprising a series of sections E of yielding material provided with rectangular bases having shoulders on all the four edges, in combination with a wheel-rim D having internal lips D' matching to and engaging two of the shoulders, E', and with the removable cross-plates J matching to and engaging the remaining two shoulders $E^2$, all adapted to serve substantially as herein specified.

2. A tire comprising a series of sections E of yielding material traversed by sheets of canvas or analogous material F and provided with rectangular bases having shoulders on all the four edges, in combination with a wheel-rim D having internal lips D' matching to and engaging two of the shoulders E', and with the removable cross-plates J, matching to and engaging the remaining two shoulders $E^2$, and with transverse pins I extending through the several bases and further engaging the several sections of yielding material with the rim, all arranged for joint operation substantially as herein specified.

3. A tire comprising a series of sections E, of yielding material provided with rectangular bases having shoulders on all the four edges, in combination with a wheel-rim D having internal lips D' matching to and engaging two of the shoulders E', and with the removable cross-plates J, matching to and engaging the remaining two shoulders $E^2$, and with cement H joining the several sections but allowing of their detachment when required, all substantially as herein specified.

4. A tire comprising a series of sections E, of yielding material traversed by toughening-webs F and provided with rectangular bases having shoulders E' $E^2$ on the four edges, in combination with a wheel-rim D having internal lips D' matching to and engaging two of the shoulders, and with the removable cross-plates J matching to and engaging the remaining two shoulders, transverse pins I engaging the several sections of yielding material and cement H uniting the several sections but allowing of their detachment when required, all substantially as herein specified.

Dated this 25th day of July, 1896.

JOSEPH LINDSAY.

Witnesses:
ANGELO FAHIE,
J. M. MURRAY.